United States Patent
Zhao et al.

(10) Patent No.: US 12,484,080 B2
(45) Date of Patent: Nov. 25, 2025

(54) DATA PROCESSING METHOD AND APPARATUS

(71) Applicant: Huawei Technologies Co., Ltd., Shenzhen (CN)

(72) Inventors: Wei Zhao, Dongguan (CN); Jianshun Chuai, Dongguan (CN); Bo Xie, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 737 days.

(21) Appl. No.: 17/700,014

(22) Filed: Mar. 21, 2022

(65) Prior Publication Data

US 2022/0210797 A1 Jun. 30, 2022

Related U.S. Application Data

(63) Continuation of application No. PCT/CN2020/116185, filed on Sep. 18, 2020.

(30) Foreign Application Priority Data

Sep. 20, 2019 (CN) .......................... 201910893730.1

(51) Int. Cl.
*H04W 72/54* (2023.01)
*H04W 72/044* (2023.01)
*H04W 72/541* (2023.01)

(52) U.S. Cl.
CPC ......... *H04W 72/54* (2023.01); *H04W 72/044* (2013.01); *H04W 72/541* (2023.01)

(58) Field of Classification Search
CPC ... H04W 72/044; H04W 72/50; H04W 72/54; H04W 72/541
See application file for complete search history.

(56) References Cited

U.S. PATENT DOCUMENTS

2020/0107227 A1\* 4/2020 Xu .................. H04L 5/1469
2021/0385048 A1\* 12/2021 Ren ................. H04L 5/0062

FOREIGN PATENT DOCUMENTS

CN 105530701 A 4/2016
CN 107819491 A 3/2018
(Continued)

OTHER PUBLICATIONS

Intel Corporation, "RIM-RS design," R1-1900491, 3GPP TSG RAN WG1 Meeting AH 1901, Taipei, Taiwan, Jan. 21-25, 2019 (Year: 2019).\*

(Continued)

*Primary Examiner* — Brian P Cox
(74) *Attorney, Agent, or Firm* — Leydig, Voit & Mayer, Ltd.

(57) ABSTRACT

This application provides a data processing method and an apparatus, to detect an interference source, shorten a transmit period and a detection period of a feature sequence, and improve interference detection efficiency. The method includes: determining, by a first base station, a transmit parameter of a first feature sequence based on a first bandwidth and a preset rule, where the first bandwidth is a bandwidth greater than a threshold in a plurality of base stations; and if a frequency corresponding to the transmit parameter of the first feature sequence falls within a bandwidth range of the first base station, sending, by the first base station, the first feature sequence in the bandwidth range of the first base station, so that when receiving the first feature sequence, a second base station determines, based on the first feature sequence, whether the first base station causes interference to the second base station.

14 Claims, 4 Drawing Sheets

(56) References Cited

FOREIGN PATENT DOCUMENTS

| CN | 107920356 A | 4/2018 |
|---|---|---|
| CN | 109040947 A | 12/2018 |
| CN | 110139290 A | 8/2019 |
| KR | 20080046404 A | 5/2008 |
| WO | 2018063997 A1 | 4/2018 |

OTHER PUBLICATIONS

CMCC, "Discussions on open issues of NR RIM RS design", R1-1900413, 3GPP TSG RAN WG1 Adhoc Meeting, Taipei, Jan. 21-25, 2019 (Year: 2019).*

"Discussion on frequency domain aspects for RIM-RS," 3GPP TSG RAN WG1 Ad-Hoc Meeting 1901, Taipei, R1-1901267, Total 4 pages, 3rd Generation Partnership Project, Valbonne, France (Jan. 21-25, 2019).

"Discussion on reference signal design for identifying remote interference," 3GPP TSG RAN WG1 Meeting #95, Spokane, USA, R1-1812217, Total 11 pages, 3rd Generation Partnership Project, Valbonne, France (Nov. 12-16, 2018).

CMCC, "Feature lead summary for NR RIM," 3GPP TSG RAN WGI Adhoc Meeting, Taipei, R1-1901309, Total 35 pages, 3rd Generation Partnership Project, Valbonne, France (Jan. 21-25, 2019).

Ericsson, "Introduction of remote interference management," 3GPP TSG-RAN WG1 Meeting #96bis Xian, China, R1-1904647, total 11 pages, 3rd Generation Partnership Project, Valbonne, France (Apr. 8-12, 2019).

* cited by examiner

DATA PROCESSING METHOD AND APPARATUS

CROSS-REFERENCE TO RELATED APPLICATIONS

This application is a continuation of International Application No. PCT/CN2020/116185, filed on Sep. 18, 2020, which claims priority to Chinese Patent Application No. 201910893730.1, filed on Sep. 20, 2019. The disclosures of the aforementioned applications are hereby incorporated by reference in their entireties.

TECHNICAL FIELD

Embodiments of this application relate to the field of communications technologies, and in particular, to a data processing method and an apparatus.

BACKGROUND

Atmospheric ducting is a natural phenomenon that occurs in a specific meteorological condition and geographical condition. A radio electromagnetic wave can be transmitted over an ultra-long distance in an atmospheric duct, and experiences little attenuation. For example, in a time division duplex (TDD) system, a downlink signal of a far-end base station still has relatively strong strength after being transmitted over an ultra-long distance, and a signal propagation delay exceeds a guard period (GP). As a result, the downlink signal falls into an uplink receive window of a near-end base station, causing serious uplink interference.

Interference source detection of an atmospheric ducting feature is currently an effective means for atmospheric ducting detection. A transmit device sends a feature sequence, and a receiving device detects the feature sequence based on a corresponding rule. However, different base stations may have different mapping rules. This causes a feature sequence detection error between base stations. For example, in a TDD system of new radio (NR), a base station may perform frequency division based on a bandwidth. Bandwidths for base stations may be different, so that frequency division corresponding to the base stations is also different. Therefore, feature sequences sent in frequency bands may also be different, which causes a feature sequence detection error between the base stations.

SUMMARY

This application provides a data processing method and an apparatus, to detect an interference source, shorten a transmit period and a detection period of a feature sequence, and improve interference detection efficiency.

In view of this, a first aspect of this application provides a data processing method, applied to a communications system. The communications system includes a plurality of base stations, there are a plurality of bandwidths for the plurality of base stations, and the method includes:

A first base station determines a transmit parameter of a first feature sequence based on a first bandwidth and a preset rule, where the first bandwidth is a bandwidth greater than a threshold in the plurality of base stations. If a frequency corresponding to the transmit parameter of the first feature sequence falls within a bandwidth range of the first base station, the first base station sends the first feature sequence in the bandwidth range of the first base station, so that when receiving the first feature sequence, a second base station determines, based on the first feature sequence, whether the first base station causes interference to the second base station.

In this implementation of this application, a feature sequence may be sent based on a relatively large bandwidth in the communications system, to improve transmission and detection efficiency of the feature sequence, so that the base stations in the communications system can uniformly determine a transmit parameter of the feature sequence based on a bandwidth greater than a threshold, and send the feature sequence, thereby shortening a transmit period and a detection period of the feature sequence. In particular, in a communications system with a hybrid bandwidth, after uniformly determining a transmit parameter of a feature sequence based on a bandwidth greater than a threshold (for example, a maximum bandwidth in the communications system), base stations in the communications system can determine, based on the bandwidth greater than the threshold, an interference source corresponding to a received transmit sequence, to implement fast and effective interference monitoring. In the hybrid bandwidth scenario, a transmit period and a detection period of the feature sequence may be shortened by multiple times, and a network resource may be adjusted in time, thereby improving working efficiency of the base station and improving data transmission reliability.

In an optional implementation, if the frequency corresponding to the transmit parameter of the first feature sequence does not fall within the bandwidth range of the first base station, the first base station does not send the first feature sequence.

In this implementation of this application, if a bandwidth corresponding to a transmit parameter of a feature sequence does not fall within the bandwidth range of the first base station, the feature sequence is not sent, so that the first base station can send only a feature sequence falling within the bandwidth range.

In an optional implementation, before a first base station determines a transmit parameter of a first feature sequence based on a preset rule, the method further includes:

The first base station maps an identifier of the first base station based on a preset mapping rule, to obtain the first feature sequence.

In this implementation of this application, before sending a feature sequence, the first base station may map the identifier of the first base station based on a preset rule, so that when receiving the feature sequence, another base station can identify an interference source based on the feature sequence, to determine whether the first base station causes interference to the base station.

In an optional implementation, the transmit parameter includes parameters corresponding to frequency domain, time domain, and code domain that are used for sending the first feature sequence.

In this implementation of this application, the transmit parameter may include parameters corresponding to frequency domain, time domain, and code domain that are used for sending a feature sequence, so that the first base station can send a feature sequence whose frequency band correspondingly falls within the bandwidth range of the first base station.

In a possible implementation, the method further includes:

The first base station receives a second feature sequence. The first base station detects, based on the first bandwidth, a parameter corresponding to the second feature sequence; and determines, based on the parameter of the second feature sequence, whether an interference source corresponding to the second feature sequence causes interference.

In this implementation of this application, the base station in the communications system may send and receive a feature sequence based on the first bandwidth. Generally, a larger bandwidth indicates a larger frequency division value, and a smaller transmit period and detection period of the feature sequence is obtained based on a larger frequency division value. Therefore, in this implementation of this application, a transmit period and a detection period of the feature sequence may be shortened based on the first bandwidth greater than the threshold, so that the base station can detect an interference source in time, and adjust a network resource in time, thereby improving data transmission reliability.

In an optional implementation, the first bandwidth is a maximum bandwidth in the plurality of bandwidths.

A second aspect of this application provides a base station, and the base station has a function of implementing the data transmission method in the first aspect. The function may be implemented by hardware, or may be implemented by hardware executing corresponding software. The hardware or the software includes one or more modules corresponding to the function.

A third aspect of this application provides a base station, which may include:
a processor, a memory, a bus, and an input/output interface, where the processor, the memory, and the input/output interface are connected through the bus; the memory is configured to store program code; and when invoking the program code in the memory, the processor performs the steps performed by the base station provided in any one of the first aspect or the implementations of the first aspect of this application.

A fourth aspect of this application provides a chip system. The chip system includes a processor, configured to support a base station in implementing functions in the foregoing aspects, for example, processing data and/or information in the foregoing methods. In a possible design, the chip system further includes a memory. The memory is configured to store program instructions and data that are necessary for the base station. The chip system may include a chip, or may include a chip and another discrete component.

The foregoing processor may be a general-purpose central processing unit (CPU), a microprocessor, an application-specific integrated circuit (ASIC), or one or more integrated circuits for controlling program execution of the data processing method in the first aspect.

A fifth aspect of this application provides a storage medium. It should be noted that the technical solutions of the present invention essentially, or the part contributing to the conventional technology, or all or some of the technical solutions may be implemented in a form of a software product. The computer software product is stored in a storage medium and is used to store computer software instructions used by the foregoing device, and the computer software product includes a program designed for a base station to perform any aspect of the first aspect.

The storage medium includes various media that may store program code, such as a USB flash drive, a removable hard disk, a read-only memory (ROM), a random access memory (RAM), a magnetic disk, or an optical disc.

A sixth aspect of this application provides a computer program product including instructions. When the computer program product is run on a computer, the computer is enabled to perform the method according to any of the optional implementations of the first aspect of this application.

A seventh aspect of this application provides an apparatus. The apparatus may be applied to an electronic device. The apparatus is coupled to a memory, and is configured to read and execute instructions stored in the memory, so that the apparatus implements the steps performed by a processor in any one of the implementations of the second aspect of this application. In a possible design, the apparatus is a chip or a system-on-chip.

In the implementations of this application, a feature sequence may be sent based on a relatively large bandwidth in the communications system, to improve transmission and detection efficiency of the feature sequence, so that the base stations in the communications system can uniformly determine a transmit parameter of the feature sequence based on a large bandwidth, and send the feature sequence, thereby shortening a transmit period and a detection period of the feature sequence. In particular, in a communications system with a hybrid bandwidth, after uniformly determining a transmit parameter of a feature sequence based on a large bandwidth, base stations in the communications system can mutually determine an interference source corresponding to a received transmit sequence, to implement fast and effective interference monitoring. In the hybrid bandwidth scenario, a transmit period and a detection period of the feature sequence may be shortened by multiple times, and a network resource may be adjusted in time, thereby improving working efficiency of the base station and improving data transmission reliability.

DESCRIPTION OF EMBODIMENTS

This application provides a data processing method and an apparatus, to detect an interference source, shorten a transmit period and a detection period of a feature sequence, and improve interference detection efficiency.

The data processing method provided in this application may be applied to various communications systems, for example, a 5th-generation (5G) mobile communications technology system, a Long Term Evolution (LTE) system, a global system for mobile communications (GSM), a code division multiple access (CDMA) network, or a wideband code division multiple access (WCDMA) network; or may be applied to a future communications network, such as a 6G network, a 7G network, or another communications system.

A base station in the embodiments of this application may be an access network device, such as a macro base station, a micro base station, a hotspot (pico), a femtocell (femeto), a transmission point (TP), a relay, or an access point (AP);

or may be an eNodeB (eNB) in Long Term Evolution (LTE) or a gNodeB (gNB) in new radio (NR).

Figure 1A:
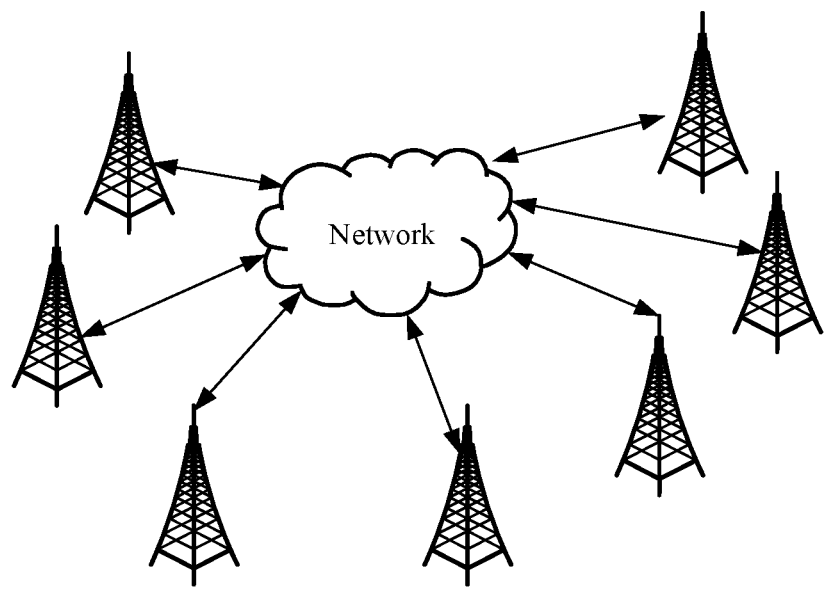
FIG. 1A is a schematic diagram of a system architecture applied to this application.

For example, a communications system of the data processing method provided in this application is shown in FIG. 1A. The communications system may include a plurality of base stations, and a connection is established between access networks or core networks in the plurality of base stations by using a network. Each base station may correspond to one or more cells, and one or more terminal devices may access each base station. The base station may send information to the accessed terminal device, or may send information to another base station.

Figure 1B:
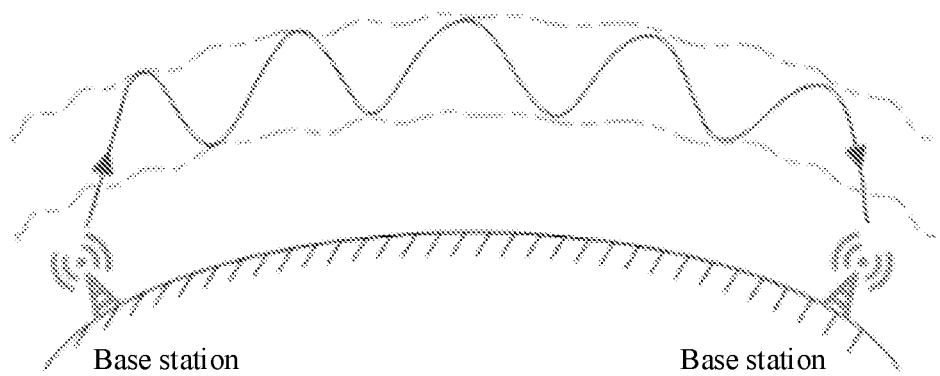
FIG. 1B is a schematic diagram of an application scenario according to this application.

When sending information, the base station has a limited transmit distance. However, when an atmospheric ducting scenario occurs, a transmit distance of a signal of the base station may be increased, and the signal still has relatively strong strength after being transmitted over an ultra-long distance, which causes interference to a base station beyond a long distance, and affects data transmission of the base station beyond the long distance. For example, as shown in FIG. 1B, when atmospheric ducting occurs, a signal of the base station is transmitted over a relatively long distance, which causes interference to a remote base station, and affects data transmission of the remote base station.

Generally, atmospheric ducting feature interference source detection is currently an effective means for atmospheric ducting detection and includes the following: A transmit-side base station sends a feature sequence, and a receive-side base station detects the feature sequence based on a preset rule after receiving the feature sequence. In a 4G communications system, when a feature sequence is sent and detected, different operators may use different rules. As a result, base stations belonging to different operators cannot mutually detect a feature sequence or a detection error occurs, and consequently atmospheric ducting cannot be effectively detected.

In a TDD-based NR system, frequency division is performed on a bandwidth. For example, if a bandwidth for a first base station is 80 MHz, 4-frequency division may be performed to obtain four frequency bands in the 80 MHz bandwidth. The first base station may send a corresponding feature sequence on one of the four frequency bands, so that a second base station that receives the feature sequence on a corresponding frequency band can determine, based on the received feature sequence, whether the first base station causes interference to the second base station. However, different base stations may have different bandwidths. For example, the first base station has an 80 MHz bandwidth and 4-frequency division is performed on the 80 MHz bandwidth, and the second base station has a 40 MHz bandwidth and 2-frequency division is performed on the 40 MHz bandwidth. In an existing solution, a minimum bandwidth detection method may be used. To be specific, each base station detects and sends a feature sequence based on a frequency band of a base station with a minimum bandwidth in a communications system. For example, if a bandwidth for the base station with the minimum bandwidth in the communications system is 20 MHz, and a bandwidth for a remaining one or more base stations ranges from 20 MHz to 80 MHz, the base station in the communications system may send and detect a feature sequence in the 20 MHz bandwidth. However, a frequency division value is usually inversely proportional to a transmit period and a detection period of a feature sequence, and a lower frequency division value indicates a longer transmit period and detection period of the feature sequence. Therefore, a low frequency division value affects detection efficiency of the feature sequence.

Therefore, this application provides a data processing method, to send and detect a feature sequence in a hybrid bandwidth scenario, shorten a detection period, and improve detection efficiency of the feature sequence.

The data processing method provided in this application may be applied to the foregoing various communications systems. The communications system may include a plurality of base stations. Bandwidths included in the plurality of base stations may be the same or may be different. In addition, the plurality of base stations may belong to a same operator or may belong to different operators. In the following implementation of this application, a first base station is used as an example for description, and the first base station is any of the plurality of base stations included in the communications system.

Figure 2:
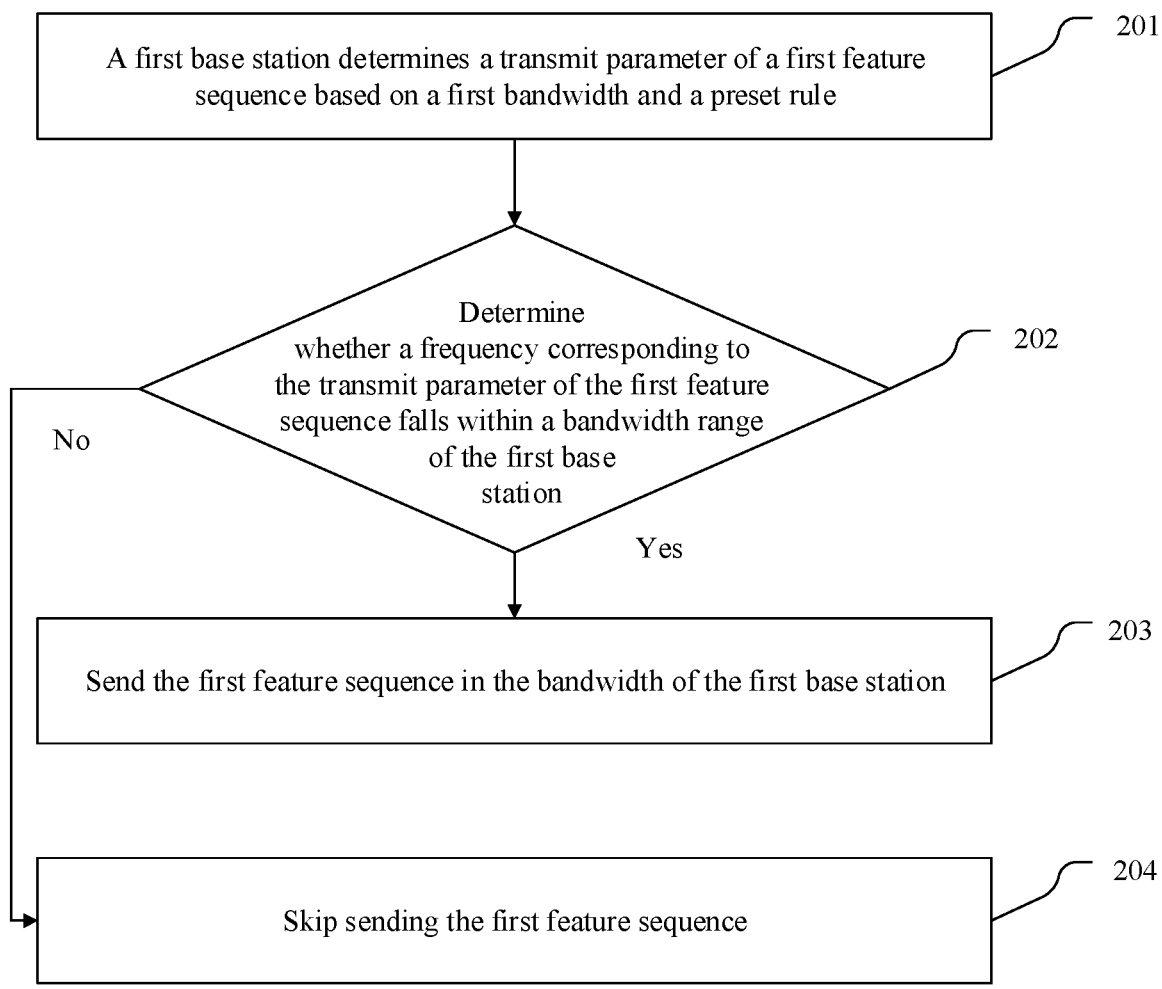
FIG. 2 is a schematic flowchart of a data processing method according to this application.

Referring to FIG. 2, a schematic flowchart of the data processing method provided in this application is as follows.

201. The first base station determines a transmit parameter of a first feature sequence based on a first bandwidth and a preset rule.

The first base station determines the transmit parameter of the first feature sequence based on the first bandwidth and the preset rule, and the first bandwidth is a bandwidth greater than a threshold in the plurality of bandwidths of the plurality of base stations in the communications system.

Generally, the first feature sequence may be sent a plurality of times, and a corresponding transmit frequency band is fixed.

Generally, the first bandwidth may be a maximum bandwidth in the communications system. The first base station is any of one or more base stations in the communications system.

It can be understood as follows: The first bandwidth may be a maximum bandwidth or may be a second maximum bandwidth in bandwidths used by the plurality of base stations in the communications system, and may be specifically adjusted based on an actual application scenario. This is not limited in this application.

Specifically, the transmit parameter may include parameters corresponding to time domain, code domain, and frequency domain of each feature sequence. For example, the transmit parameter may include a transmit frequency band, a transmit period, code division information, and the like of the first feature sequence.

Optionally, before step 201, an identifier of the first base station may be mapped based on a preset mapping rule, to obtain the first feature sequence. For example, a setID (namely, the identifier) of the first base station may be mapped based on a preset rule, to obtain the first feature sequence. Each base station in the communications system can map an identifier of the base station by using a same or related mapping rule to obtain a feature sequence corresponding to each base station, so that after receiving the feature sequence, another base station can decode the feature sequence to obtain the identifier of the base station corresponding to the feature sequence, to determine an interference source.

Specifically, the first base station may calculate a transmit parameter of a feature sequence by using a preset formula. The preset formula may be set or modified by an operator, may be generated by a core network device or another device based on a preset rule, and so on. For example, the preset formula may include:

$$i_t^{RIM} = T_{start} + \left(\left\lfloor \frac{n_{setID}}{N_S^{RIM}} \right\rfloor \bmod N_T^{RIM}\right)R + \bar{r}, \text{ where}$$

$$i_f^{RIM} = \left(\left\lfloor \frac{n_{setID}}{N_T^{RIM} N_S^{RIM}} \right\rfloor \bmod N_F^{RIM}\right),$$

$$i_s^{RIM} = S_{start} + (n_{setID} \bmod N_S^{RIM}), \text{ and}$$

$$n_{setID} = (i_s^{RIM} - S_{start}) + N_S^{RIM}\left\lfloor \frac{i_t^{RIM} - T_{start}}{R} \right\rfloor + N_T^{RIM} N_S^{RIM} i_f^{RIM}.$$

$i_t^{RIM}$ is a transmit moment of RIM-RS, RIM-RS is the feature sequence, $i_f^{RIM}$ is transmit frequency domain of RIM-RS, and $i_s^{RIM}$ is a transmit frequency of RIM-RS. $T_{start}$ is a start time domain offset; $n_{setID}$ is an interference resource ID, namely, a setID; $N_T^{RIM}$ is a time-domain transmit period; $N_S^{RIM}$ is a total quantity of feature sequences; $N_F^{RIM}$ is a total quantity of resources in frequency domain (that is, the foregoing frequency division value, such as 4-frequency division and 2-frequency division) of RIM-RS; $S_{start}$ is a start sequence offset; R is a quantity of repetitions; $\bar{r}$ is an integer value in a range of [0, R−1]. It can be understood as that parameters such as a transmit sequence, transmit frequency domain, start time domain, and a time-domain transmit period of the feature sequence RIM-RS may be determined according to the foregoing formula. In addition, $N_F^{RIM}$ may be determined based on the first bandwidth for the base station in the communications system. For example, if the maximum bandwidth in the communications system is greater than or equal to 80 MHz, and segmentation is performed on the bandwidth based on 4-frequency division, values of $N_F^{RIM}$ all are 4 when the base stations in the communications system determine the transmit parameter. In other words, the transmit parameter of the feature sequence is determined based on the maximum bandwidth in the communications system.

In addition, it can be learned according to the foregoing formula that the transmit period $N_T^{RIM}$ is inversely proportional to $N_F^{RIM}$. Therefore, a transmit period is relatively larger if the transmit parameter of the first feature sequence is determined based on a minimum bandwidth However, in this implementation of this application, if the transmit parameter of the first feature sequence is determined based on the relatively large first bandwidth (for example, a maximum bandwidth or a second maximum bandwidth in the communications system) and a corresponding frequency division value, the transmit period is shortened, so that a transmit period of a feature sequence can be shortened, thereby shortening a detection period of the feature sequence, and improving efficiency of detecting interference in the communications system. In this way, a network resource can be adjusted in time, thereby improving data transmission stability.

202. Determine whether a frequency corresponding to the transmit parameter of the first feature sequence falls within a bandwidth range of the first base station; and perform step 203 if the frequency corresponding to the transmit parameter of the first feature sequence falls within the bandwidth range of the first base station; or perform step 204 if the frequency corresponding to the transmit parameter of the first feature sequence does not fall within the bandwidth range of the first base station.

After determining the transmit parameter of the first feature sequence in step 201, the first base station determines whether the frequency corresponding to the transmit parameter of the first feature sequence falls within the bandwidth range of the first base station. If the frequency corresponding to the transmit parameter of the first feature sequence falls within the bandwidth range of the first base station, the first base station sends the first feature sequence in the bandwidth of the first base station, that is, performs step 203. Alternatively, if the frequency corresponding to the transmit parameter of the first feature sequence does not fall within the bandwidth range of the first base station, the first base station does not send the first feature sequence, that is, performs step 204.

For example, based on the specific description in step 201, parameters such as a transmit sequence, transmit frequency domain, start time domain, and a time-domain transmit period of the first feature sequence may be calculated, and whether to send the first feature sequence in the bandwidth range of the first base station may be determined based on parameters such as the transmit frequency domain and the start frequency domain. If the first feature sequence is to be sent in the bandwidth range of the first base station, the first feature sequence may be sent in the bandwidth range of the first base station, that is, step 203 may be performed. Alternatively, if the first feature sequence is not to be sent in the bandwidth range of the first base station, the first feature sequence may not be sent.

203. Send the first feature sequence in the bandwidth for the first base station.

If it is determined, based on the transmit parameter of the first feature sequence, that a start frequency and an end frequency that are used for sending the first feature sequence fall within a bandwidth that is of the base station and in which sending can be performed, the first feature sequence may be sent on a corresponding frequency band.

Specifically, the first feature sequence is sent based on the transmit parameter calculated in step 201. For example, if parameters such as a transmit sequence, transmit frequency domain, start time domain, and a time-domain transmit period are calculated in step 201, the transmit sequence may be sent based on the transmit frequency domain, the start time domain, the time-domain transmit period, and the like that are calculated.

204. Skip sending the first feature sequence.

If it is determined, based on the transmit parameter of the first feature sequence, that the start frequency and the end frequency that are used for sending the first feature sequence do not fall within the bandwidth that is of the base station and in which sending can be performed, the first base station does not send the first feature sequence.

It should be noted that step 204 in this embodiment of this application is an optional step.

In an optional implementation, frequency domain for sending a feature sequence of the first base station may be further planned, and the identifier of the first base station is mapped based on the preset mapping rule, to obtain a feature sequence mapped into the bandwidth range of the first base station. To be specific, the first base station or an access network device or a core network device in the communications system may perform planning, so that a frequency domain location corresponding to the transmit parameter of the first feature sequence falls within the bandwidth range of the first base station; the first base station can send the first feature sequence; and another base station, such as a second base station, can detect the first feature sequence of the first base station, and determine whether the first base station causes interference to the second base station.

In the implementations of this application, a feature sequence may be sent based on a relatively large bandwidth in the communications system, to improve transmission and detection efficiency of the feature sequence, so that the base stations in the communications system can uniformly determine a transmit parameter of the feature sequence based on a large bandwidth, and send the feature sequence, thereby shortening a transmit period and a detection period of the feature sequence. In particular, in a communications system with a hybrid bandwidth, after uniformly determining a transmit parameter of a feature sequence based on a large bandwidth, base stations in the communications system can mutually determine an interference source corresponding to a received transmit sequence, to implement fast and effective interference monitoring. In the hybrid bandwidth scenario, a transmit period and a detection period of the feature sequence may be shortened by multiple times, and a network resource may be adjusted in time, thereby improving working efficiency of the base station and improving data transmission reliability.

A feature sequence transmit procedure in the data processing method provided in this application is described above in detail. Specific steps for receiving a feature sequence by a base station are described below in detail with reference to FIG. 2 and a corresponding specific implementation.

Figure 3:
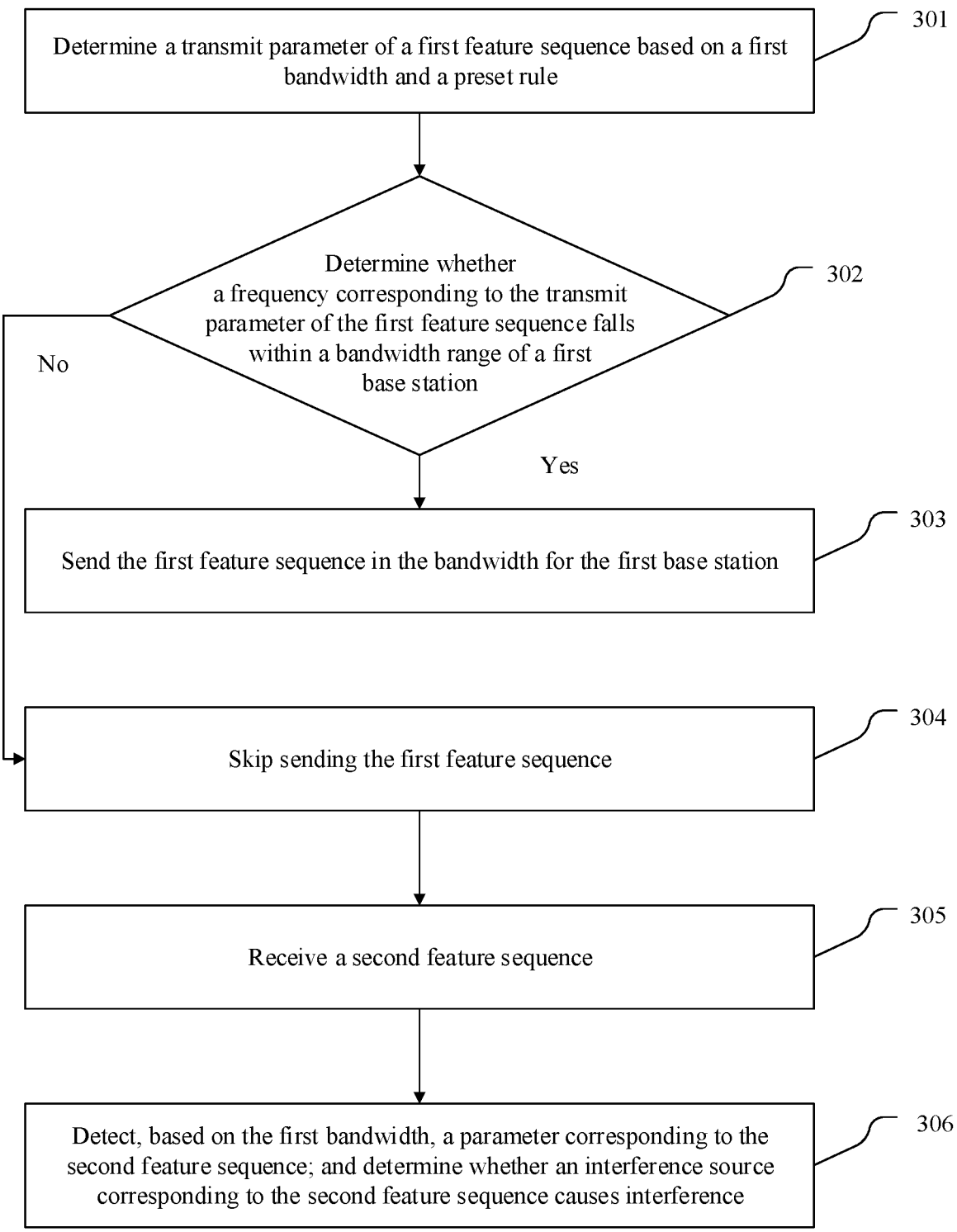
FIG. 3 is another schematic flowchart of a data processing method according to this application.

Referring to FIG. 3, a schematic flowchart of another data processing method provided in this application is as follows.

301. Determine a transmit parameter of a first feature sequence based on a first bandwidth and a preset rule.

302. Determine whether a frequency corresponding to the transmit parameter of the first feature sequence falls within a bandwidth range of a first base station; and perform step 303 if the frequency corresponding to the transmit parameter of the first feature sequence falls within the bandwidth range of the first base station; or perform step 304 if the frequency corresponding to the transmit parameter of the first feature sequence does not fall within the bandwidth range of the first base station.

303. Send the first feature sequence in the bandwidth for the first base station.

304. Skip sending the first feature sequence.

It should be noted that steps 301 to 304 in this embodiment of this application are similar to steps 201 to 204, and reference may be made to related descriptions in the steps 201 to 204. Details are not described herein again.

305. Receive a second feature sequence.

The first base station may receive the second feature sequence sent from another base station in a communications system.

In addition, the first base station may receive the second feature sequence in a bandwidth range of the first bandwidth in the communications system. For example, if a bandwidth for the first base station is 40 MHz and a maximum bandwidth in the communications system is 80 MHz, the first base station may receive the second feature sequence in the 80 MHz range.

It should be noted that step 305 may be performed after step 304, may be performed after step 303, or may be performed before or after step 301 or step 302. This may be specifically adjusted based on an actual application scenario, and is not limited in this application.

306. Detect, based on the first bandwidth, a parameter corresponding to the second feature sequence; and determine whether an interference source corresponding to the second feature sequence causes interference.

After receiving the second feature sequence, the first base station detects the second feature sequence based on the first bandwidth to obtain the parameter corresponding to the second feature sequence; and determines, based on the parameter corresponding to the second feature sequence, whether the base station that sends the second feature causes interference to the first base station. The first bandwidth may be a maximum bandwidth in the communications system, or may be a bandwidth greater than a threshold in the communications system.

Specifically, referring to the specific manner of determining the transmit parameter in step 201, similarly, the first base station may calculate an interference source ID based on the first bandwidth in the communications system, and then determine, based on the interference source ID and the second feature sequence, whether the interference source causes interference to the first base station. For example, if the first base station receives the second feature sequence sent by a second base station, after identifying an interference source ID of the second base station, the first base station can determine that the second base station causes interference to the first base station. For example, if atmospheric ducting occurs in the communications system, the first base station is far away from the second base station, and the first base station receives a feature sequence sent by the second base station, after identifying the interference source ID, the first base station can determine that the second base station causes interference to the first base station. Alternatively, if the first base station determines, based on signal strength, receive power, and the like of the second feature sequence, that the interference source corresponding to the second feature sequence causes interference to the first base station, after identifying an interference source ID corresponding to the second feature sequence, the first base station can determine that the second base station causes interference to the first base station, and so on.

It can be understood as that in this implementation of this application, the first base station may send a feature sequence in the bandwidth range of the first base station, and may detect a feature sequence in a full bandwidth range of the communications system, to more accurately detect interference.

Therefore, in this implementation of this application, base stations in the communications system may uniformly map a feature sequence to a transmit sequence based on the first bandwidth, so that the base stations in the communications system can receive a sent feature sequence from each other, and further detect, based on the first bandwidth, whether interference is caused to the base stations. Generally, the first bandwidth may be a maximum bandwidth in the communications system. Therefore, the base station in the communications system may map a feature sequence to a transmit sequence based on the maximum bandwidth in the communications system, and send the feature sequence in a bandwidth range of the base station, so that a base station that receives the feature sequence can detect the feature sequence in a maximum bandwidth range based on the maximum bandwidth, to determine whether interference is caused to the base station and an interference source that causes the interference. In this way, it can be avoided that the base stations in the communications system cannot detect each other due to different bandwidths, causing a case in which interference exists in the base station but an interference source cannot be learned. In addition, compared with that the base station in the communications system sends and receives a feature sequence based on a minimum bandwidth, using the maximum bandwidth can shorten a transmit period of the feature sequence, and improve transmission and detection efficiency of the feature sequence in the system.

For example, the data processing method provided in this application is described below by using different scenarios as examples.

Scenario 1: The maximum bandwidth is greater than or equal to 80 MHz, and mapping is uniformly performed based on 4-frequency division.

For example, an NR system includes a continuous spectrum resource of a 100 MHz bandwidth, which is shared by a plurality of base stations. In the NR system, a maximum bandwidth is 80 MHZ, and a minimum bandwidth is 20 MHz. In addition, 4-frequency division is performed on the 80 MHz bandwidth.

In this case, all base stations in the NR system map a feature sequence based on the 80 MHz bandwidth and 4-frequency division to determine a transmit parameter of each feature sequence, including a transmit sequence, transmit frequency domain, start time domain, a time-domain transmit period, and another parameter.

Specifically, calculation may be performed by using a formula, for example:

$$i_t^{RIM} = T_{start} + \left(\left\lfloor \frac{n_{setID}}{N_S^{RIM}} \right\rfloor \mod N_T^{RIM}\right)R + \bar{r},$$

$$i_f^{RIM} = \left(\left\lfloor \frac{n_{setID}}{N_T^{RIM} N_S^{RIM}} \right\rfloor \mod N_F^{RIM}\right),$$

$$i_s^{RIM} = S_{start} + (n_{setID} \mod N_S^{RIM}), \text{ and}$$

$$n_{setID} = (i_s^{RIM} - S_{start}) + N_S^{RIM} \left\lfloor \frac{i_t^{RIM} - T_{start}}{R} \right\rfloor + N_T^{RIM} N_S^{RIM} i_f^{RIM}.$$

$N_F^{RIM}$ is uniformly 4. In other words, all the base stations in the NR system send and detect a feature sequence based on 4-frequency division.

When it is determined that a transmit parameter of a specific feature sequence correspondingly falls within a bandwidth range of the base station, the base station sends the feature sequence. If a frequency band corresponding to the transmit parameter of the feature sequence does not fall within the bandwidth range of the base station, the base station does not send the feature sequence.

It can be understood as follows: A base station greater than or equal to 80 MHz may normally send a feature sequence mapped based on 4-frequency division, and detect a received feature sequence in an 80 MHz range. A base station greater than or equal to 40 MHz and less than 80 MHz maps a feature sequence based on 4-frequency division, but sends the feature sequence in a range of an available 40 MHz bandwidth, and detects a received feature sequence based on 4-frequency division in an 80 MHz range. A base station greater than or equal to 20 MHz and less than 40 MHz maps a feature sequence based on 4-frequency division, sends the feature sequence in a range of an available 20 MHz bandwidth, and detects a received feature sequence based on 4-frequency division in an 80 MHz range.

Therefore, the base station in the NR system may map and send a feature sequence by using a uniform rule, detect a received feature sequence. In addition, the feature sequence is sent and detected based on the maximum bandwidth, to shorten a transmit period and a detection period, so that the base station can obtain an interference source in time, and adjust a network resource in time, thereby improving data transmission reliability.

Scenario 2: The maximum bandwidth is greater than or equal to 40 MHz and less than 80 MHz, and mapping is uniformly performed based on 2-frequency division.

Similar to Scenario 1, an NR system includes a continuous spectrum resource of a 100 MHz bandwidth, which is shared by a plurality of base stations. In the NR system, a maximum bandwidth is 70 MHz, and a minimum bandwidth is 20 MHz or 30 MHz. In addition, 2-frequency division is performed on the 70 MHz bandwidth.

In this case, all base stations in the NR system map a feature sequence based on the 70 MHz bandwidth and 2-frequency division to determine a transmit parameter of each feature sequence, including a transmit sequence, transmit frequency domain, start time domain, a time-domain transmit period, and another parameter.

A base station greater than or equal to 40 MHz and less than 80 MHz maps a feature sequence based on 2-frequency division, but sends the feature sequence in a range of an available 40 MHz bandwidth, and detects a received feature sequence based on 2-frequency division in a 40 MHz range. A base station greater than or equal to 20 MHz and less than 40 MHz maps a feature sequence based on 2-frequency division, sends the feature sequence in a range of an available 20 MHz bandwidth, and detects a received feature sequence based on 2-frequency division in a 40 MHz range.

Therefore, the base station in the NR system may send and detect a feature sequence based on the maximum bandwidth, to shorten a transmit period and a detection period, so that the base station can obtain an interference source in time, and adjust a network resource in time, thereby improving data transmission reliability. In addition, based on a standard architecture, frequency division may be performed, based on a large bandwidth, on a feature sequence corresponding to a small bandwidth, and mapping rules may be unified, to resolve a problem that a transmit period and a detection period of a feature sequence of each base station in a network-wide hybrid bandwidth of NR becomes longer, thereby shortening the period by multiple times.

Scenario 3: The maximum bandwidth is greater than or equal to 80 MHz, and mapping is uniformly performed based on 2-frequency division.

Similar to Scenario 1, an NR system includes a continuous spectrum resource of a 100 MHz bandwidth, which is shared by a plurality of base stations. In the NR system, a maximum bandwidth is greater than or equal to 80 MHz, and a minimum bandwidth is 20 MHz or 30 MHz.

In this case, all base stations in the NR system map a feature sequence based on the 40 MHz bandwidth and 2-frequency division to determine a transmit parameter of each feature sequence, including a transmit sequence, transmit frequency domain, start time domain, a time-domain transmit period, and another parameter.

A base station whose bandwidth is greater than or equal to 80 MHz may map and send a feature sequence based on 2-frequency division, and detect a received feature sequence based on 2-frequency division in a 40 MHz bandwidth range. A base station greater than or equal to 40 MHz and less than 80 MHz may map and send a feature sequence based on 2-frequency division, and detect a received feature sequence based on 2-frequency division in a 40 MHz bandwidth range. A base station whose bandwidth is greater than or equal to 20 MHz and less than 40 MHz maps a feature sequence based on 2-frequency division, sends the feature sequence in an available 20 MHz range, and detects a received feature sequence based on 2-frequency division in a 40 MHz range.

Therefore, the base station in the NR system may send and detect a feature sequence based on a second maximum bandwidth. Compared with that a feature sequence is sent and detected based on a minimum bandwidth, a transmit period and a detection period of the feature sequence may also be shortened.

The data processing method provided in this application is described above in detail. Based on the foregoing method, a base station provided in this application is described below in detail.

Figure 4:
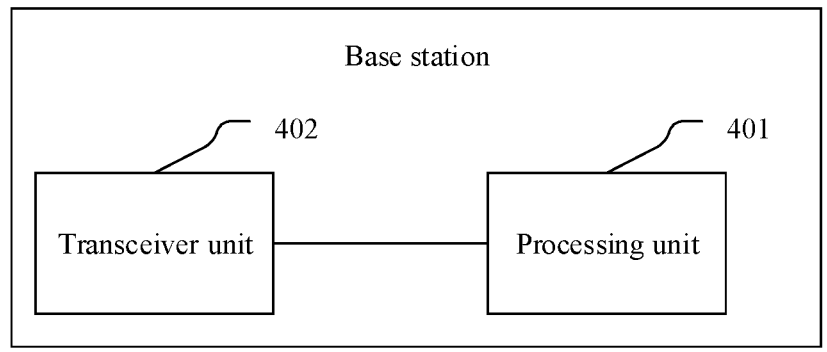
FIG. 4 is a schematic diagram of a structure of a base station according to this application.

FIG. 4 is a schematic diagram of a structure of a base station according to this application.

The base station may include a processing unit 401 and a transceiver unit 402.

The processing unit 401 is configured to determine a transmit parameter of a first feature sequence based on a first bandwidth and a preset rule, where the first bandwidth is a bandwidth greater than a threshold for a plurality of base stations.

The transceiver unit 402 is configured to: if a frequency corresponding to the transmit parameter of the first feature sequence falls within a bandwidth range of the first base station, send the first feature sequence in the bandwidth range of the base station, so that when receiving the first feature sequence, a second base station determines, based on the first feature sequence, whether the first base station causes interference to the second base station.

In an optional implementation, the transceiver unit 402 is further configured to: if the frequency corresponding to the transmit parameter of the first feature sequence does not fall within the bandwidth range of the first base station, skip sending the first feature sequence.

In an optional implementation, the processing unit 401 is further configured to map an identifier of the base station based on a preset mapping rule, to obtain the first feature sequence.

In an optional implementation, the transmit parameter may include parameters corresponding to frequency domain, time domain, and code domain that are used for sending the first feature sequence.

In an optional implementation, the transceiver unit 402 is further configured to receive a second feature sequence; and the processing unit 401 is further configured to: detect, based on the first bandwidth, a parameter corresponding to the second feature sequence; and determine, based on the parameter of the second feature sequence, whether an interference source corresponding to the second feature sequence causes interference.

Figure 5:
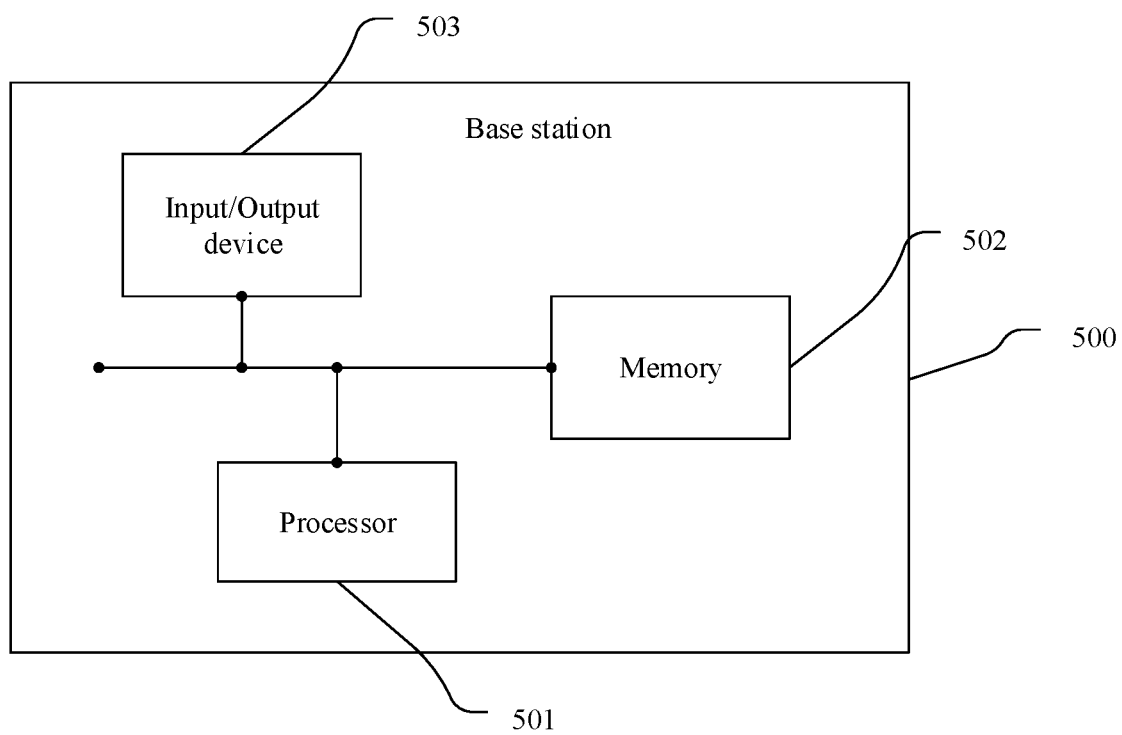
FIG. 5 is a schematic diagram of a structure of another base station according to this application.

This application further provides a base station 500. FIG. 5 shows an embodiment of the base station in this embodiment of this application. The base station may be configured to perform steps performed by the base station in any of the embodiments shown in FIG. 2 and FIG. 3, and reference may be made to related descriptions in the foregoing method embodiments.

The base station 500 includes a processor 501, a memory 502, and an input/output device 503.

In a possible implementation, the processor 501, the memory 502, and the input/output device 503 are separately connected to a bus, and the memory stores computer instructions.

The transceiver unit 402 in the foregoing embodiment may be the input/output device 503 in this embodiment. Therefore, implementation of the input/output device 503 is not described in detail.

The processing unit 401 in the foregoing embodiment may be the processor 501 in this embodiment. Therefore, implementation of the processor 501 is not described in detail.

In an implementation, the base station 500 may include more or less components than those in FIG. 5. This is merely an example description and is not limited in this application.

This application provides a chip system. The chip system includes a processor, configured to support a base station in implementing functions in the foregoing aspects, for example, sending or processing data and/or information in the foregoing methods. In a possible design, the chip system further includes a memory. The memory is configured to store necessary program instructions and data. The chip system may include a chip, or may include a chip and another discrete component.

In another possible design, when the chip system is a chip in a terminal device, a base station, or the like, the chip includes a processing unit and a communications unit. The processing unit may be, for example, a processor, and the communications unit may be, for example, an input/output interface, a pin, or a circuit. The processing unit may execute computer-executable instructions stored in a storage unit, so that the chip in the base station or the like performs the steps of the method performed by the base station in any one of the embodiments in FIG. 2 and FIG. 3. Optionally, the storage unit is a storage unit in the chip, for example, a register or a cache. The storage unit may alternatively be a storage unit that is in the base station and that is located outside the chip, for example, a read-only memory (ROM) or another type of static storage device capable of storing static information and instructions, or a random access memory (RAM).

An embodiment of this application further provides a processor, configured to be coupled to a memory. The processor is configured to perform the method and the function of the base station in any one of the foregoing embodiments.

An embodiment of this application further provides a computer-readable storage medium, and the computer-readable storage medium stores a computer program. When the computer program is executed by a computer, a method procedure related to the base station in any one of the foregoing method embodiments is implemented. Correspondingly, the computer may be the foregoing base station.

It should be understood that the processor mentioned in the base station, the chip system, or the like in the foregoing embodiments of this application, or the processor provided in the foregoing embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It should be further understood that there may be one or more processors in the base station, the chip system, and the like in the foregoing embodiments of this application. The quantity may be adjusted based on an actual application scenario. This is merely an example for description herein, and is not limited. There may be one or more memories in the embodiments of this application. The quantity may be adjusted based on an actual application scenario. This is merely an example for description herein, and is not limited.

It should be further understood that in the embodiments of this application, the memory, the readable storage medium, or the like mentioned in the base station, the chip system, or the like in the foregoing embodiments may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external buffer. By way of example and not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be further noted that when the base station includes a processor (or a processing unit) and a memory, the processor in this application may be integrated with the memory, or may be connected to the memory by using an interface. This may be adjusted based on an actual application scenario, and is not limited.

An embodiment of this application further provides a computer program or a computer program product including the computer program. When the computer program is executed on a computer, the computer is enabled to implement a method procedure related to the base station in any one of the foregoing method embodiments. Correspondingly, the computer may be the foregoing base station.

All or some of the foregoing embodiments in FIG. 2 to FIG. 3 may be implemented by using software, hardware, firmware, or any combination thereof. When software is used for implementation, all or some of the embodiments may be implemented in a form of a computer program product.

The computer program product includes one or more computer instructions. When the computer program instructions are loaded and executed on a computer, the procedures or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in various embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or another network device) to perform all or some of the steps of the methods described in various embodiments in FIG. 2 to FIG. 3 of this application. The storage medium includes various media that can store program code, such as a USB flash drive, a removable hard disk, a read-only memory (ROM), a random access memory (RAM), a magnetic disk, or an optical disc.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, terms "include", "have", and any variation thereof are intended to cover non-exclusive inclusion, so that processes, methods, systems, products, or devices that contain a series of units are not necessarily limited to those units, but may include other units that are not clearly listed or are inherent to these processes, methods, products, or devices.

Names of messages/frames/information, modules, units, or the like provided in the embodiments of this application are merely examples, and other names may be used provided that the messages/frames/information, modules, units, or the like have same functions.

The terms used in the embodiments of this application are merely for the purpose of illustrating specific embodiments, and are not intended to limit the present invention. The terms "a", "the", and "this" of singular forms used in the embodiments and the appended claims of this application are also intended to include plural forms, unless otherwise specified in a context clearly. It should be further understood that, in the description of this application, "/" represents an "or" relationship between associated objects unless otherwise specified. For example, A/B may represent A or B. The term "and/or" in this application describes only an association relationship for describing associated objects and represents that three relationships may exist. For example, A and/or B may represent the following three cases: Only A exists, both A and B exist, and only B exists, where A and B may be singular or plural.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A data processing method, applied to a communications system, wherein the communications system comprises a plurality of base stations, there are a plurality of bandwidths for the plurality of base stations, and the method comprises:
   determining, by a first base station, a transmit parameter of a first feature sequence based on a first bandwidth and a preset rule, wherein the first bandwidth is a bandwidth greater than a threshold in the plurality of bandwidths of the plurality of base stations, and the first base station is any of the plurality of base stations;
   if a frequency corresponding to the transmit parameter of the first feature sequence falls within a bandwidth range of the first base station:
      sending, by the first base station, the first feature sequence in the bandwidth range of the first base station; and
      determining, by a second base station, after receiving the first feature sequence, based on the first feature sequence, whether the first base station causes interference to the second base station;
   receiving, by the first base station, a second feature sequence;
   detecting, by the first base station based on the first bandwidth, a parameter corresponding to the second feature sequence; and
   determining, by the first base station, based on the parameter of the second feature sequence, whether an interference source corresponding to the second feature sequence causes interference.

2. The method according to claim 1, wherein the method further comprises:
   if the frequency corresponding to the transmit parameter of the first feature sequence does not fall within the bandwidth range of the first base station, skipping, by the first base station, sending the first feature sequence.

3. The method according to claim 1, wherein before the determining, by the first base station, the transmit parameter of the first feature sequence based on the first bandwidth and the preset rule, the method further comprises:
   mapping, by the first base station, an identifier of the first base station based on a preset mapping rule, to obtain the first feature sequence.

4. The method according to claim 1, wherein the transmit parameter comprises parameters corresponding to a frequency domain, a time domain, and a code domain that are used for sending the first feature sequence.

5. The method according to claim 1, wherein before the determining, by the first base station, the transmit parameter of the first feature sequence based on the first bandwidth and the preset rule, the method further comprises:
   mapping, by the first base station, an identifier of the first base station based on a preset mapping rule, to obtain the first feature sequence.

6. A first base station, comprising:
   a processor; and
   a memory coupled to the processor, wherein the memory stores instructions that, when executed by the processor, configure the first base station to perform operations comprising:
      determining, a transmit parameter of a first feature sequence based on a first bandwidth and a preset rule, wherein the first bandwidth is a bandwidth greater than a threshold in the plurality of bandwidths of the plurality of base stations;
      if a frequency corresponding to the transmit parameter of the first feature sequence falls within a bandwidth range of the first base station, sending the first feature sequence in the bandwidth range of the first base station to a second base station, wherein the first feature sequence enables the second base station to determine, based on the first feature sequence, whether the first base station causes interference to the second base station;
      receiving, a second feature sequence;
      detecting, based on the first bandwidth, a parameter corresponding to the second feature sequence; and
      determining, based on the parameter of the second feature sequence, whether an interference source corresponding to the second feature sequence causes interference.

7. The first base station according to claim 6, wherein the operations further comprises:
   if the frequency corresponding to the transmit parameter of the first feature sequence does not fall within the bandwidth range of the first base station, skipping, by the first base station, sending the first feature sequence.

8. The first base station according to claim 6, wherein before the determining, by the first base station, the transmit parameter of the first feature sequence based on the first bandwidth and the preset rule, the operations further comprises:
   mapping an identifier of the first base station based on a preset mapping rule to obtain the first feature sequence.

9. The first base station according to claim 6, wherein the transmit parameter comprises parameters corresponding to a frequency domain, a time domain, and a code domain that are used for sending the first feature sequence.

10. The method according to claim 5, wherein the transmit parameter of the first feature sequence is calculated by using a preset formula, comprising:

$$i_t^{RIM} = T_{start} + \left(\left\lfloor \frac{n_{setID}}{N_S^{RIM}} \right\rfloor \bmod N_T^{RIM}\right)R + \bar{r}, \text{ where}$$

$$i_f^{RIM} = \left(\left\lfloor \frac{n_{setID}}{N_T^{RIM} N_S^{RIM}} \right\rfloor \bmod N_F^{RIM}\right),$$

$$i_s^{RIM} = S_{start} + \left(n_{setID} \bmod N_S^{RIM}\right), \text{ and}$$

$$n_{setID} = \left(i_s^{RIM} - S_{start}\right) + N_S^{RIM} \left\lfloor \frac{i_t^{RIM} - T_{start}}{R} \right\rfloor + N_T^{RIM} N_S^{RIM} i_f^{RIM},$$

wherein $i_t^{RIM}$ is a transmit moment of RIM-RS, RIM-RS is the feature sequence, $i_f^{RIM}$ is transmit frequency domain of RIM-RS, and $i_s^{RIM}$ is a transmit frequency of RIM-RS, $T_{start}$ is a start time domain offset, $n_{setID}$ is an interference resource ID, $N_T^{RIM}$ is a time-domain transmit period, $N_S^{RIM}$ is a total quantity of feature sequences, $N_F^{RIM}$ is a total quantity of resources in frequency domain of RIM-RS, $S_{start}$ is a start sequence offset, R is a quantity of repetitions, and $\bar{r}$ is an integer value in a range of [0, R−1].

11. The method according to claim 10, wherein $N_F^{RIM}$ is determined based on the first bandwidth for the first base station, and if a maximum bandwidth in the communications systems is greater than or equal to 80 MHz, and segmentation is performed on the maximum bandwidth based on 4-frequency division, a value of $N_F^{RIM}$ is 4 when the first base station determines the transmit parameter, so that the transmit parameter of the first feature sequence is determined based on the maximum bandwidth.

12. The first base station according to claim 6, wherein before the determining, by the first base station, the transmit parameter of the first feature sequence based on the first bandwidth and the preset rule, the operations further comprise:

mapping, by the first base station, an identifier of the first base station based on a preset mapping rule, to obtain the first feature sequence.

13. The first base station according to claim 12, wherein the transmit parameter of the first feature sequence is calculated by using a preset formula, comprising:

$$i_t^{RIM} = T_{start} + \left(\left\lfloor \frac{n_{setID}}{N_S^{RIM}} \right\rfloor \bmod N_T^{RIM}\right)R + \bar{r}, \text{ where}$$

$$i_f^{RIM} = \left(\left\lfloor \frac{n_{setID}}{N_T^{RIM} N_S^{RIM}} \right\rfloor \bmod N_F^{RIM}\right),$$

$$i_s^{RIM} = S_{start} + \left(n_{setID} \bmod N_S^{RIM}\right), \text{ and}$$

$$n_{setID} = \left(i_s^{RIM} - S_{start}\right) + N_S^{RIM} \left\lfloor \frac{i_t^{RIM} - T_{start}}{R} \right\rfloor + N_T^{RIM} N_S^{RIM} i_f^{RIM},$$

wherein $i_t^{RIM}$ is a transmit moment of RIM-RS, RIM-RS is the feature sequence, $i_f^{RIM}$ is transmit frequency domain of RIM-RS, and $i_s^{RIM}$ is a transmit frequency of RIM-RS, $T_{start}$ is a start time domain offset, $n_{setID}$ is an interference resource ID, $N_T^{RIM}$ is a time-domain transmit period, $N_S^{RIM}$ is a total quantity of feature sequences, $N_F^{RIM}$ is a total quantity of resources in frequency domain of RIM-RS, $S_{start}$ is a start sequence offset, R is a quantity of repetitions, and $\bar{r}$ is an integer value in a range of [0, R−1].

14. The first base station according to claim 13, wherein $N_F^{RIM}$ is determined based on the first bandwidth for the first base station, and if a maximum bandwidth in the communications systems is greater than or equal to 80 MHZ, and segmentation is performed on the maximum bandwidth based on 4-frequency division, a value of $N_F^{RIM}$ is 4 when the first base station determines the transmit parameter, so that the transmit parameter of the first feature sequence is determined based on the maximum bandwidth.

\* \* \* \* \*